United States Patent
Kumar

(10) Patent No.: US 11,586,326 B2
(45) Date of Patent: Feb. 21, 2023

(54) SPREAD ACQUISITION AND MEASUREMENT OF CAPACITANCE SENSORS AND RELATED SYSTEMS, METHODS AND DEVICES

(71) Applicant: Microchip Technology Incorporated, Chandler, AZ (US)

(72) Inventor: Ajay Kumar, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/109,420

(22) Filed: Aug. 22, 2018

(65) Prior Publication Data

US 2019/0391686 A1   Dec. 26, 2019

Related U.S. Application Data

(60) Provisional application No. 62/688,254, filed on Jun. 21, 2018.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .... G06F 3/041; G06F 3/0414; G06F 3/04144; G06F 3/0416; G06F 3/04166; G06F 3/041662; G06F 3/044; G06F 3/0446; G06F 3/04164; G06F 3/0418; G06F 3/04182; H04B 1/69; H04J 13/00
See application file for complete search history.

(56) References Cited

U.S. PATENT DOCUMENTS

| | | | | |
|---|---|---|---|---|
| 2007/0109274 | A1* | 5/2007 | Reynolds | G06F 3/0416 345/173 |
| 2008/0158167 | A1* | 7/2008 | Hotelling | G06F 1/3262 345/173 |
| 2012/0056841 | A1 | 3/2012 | Krenik et al. | |
| 2012/0182259 | A1* | 7/2012 | Han | G06F 3/0446 345/174 |
| 2012/0319988 | A1* | 12/2012 | Schwartz | G06F 3/0446 345/174 |
| 2013/0021294 | A1* | 1/2013 | Maharyta | G06F 3/044 345/174 |

(Continued)

FOREIGN PATENT DOCUMENTS

WO    2014/175915 A1    10/2014

OTHER PUBLICATIONS

International Search Report for International Application No. PCT/US2019/034416, dated Aug. 26, 2019, 4 pages.

(Continued)

*Primary Examiner* — Keith L Crawley
(74) *Attorney, Agent, or Firm* — TraskBritt

(57) ABSTRACT

Embodiments of the disclosure relate, generally, to techniques for parallel acquisition and measurements and related circuits, systems and devices that implement those techniques. A technique for parallel acquisition and measurement generally includes simultaneously acquiring sensed signals from multiple sensor channels and determining which sensed signal of the acquired sensed signals has the largest relative contribution to a measurement.

20 Claims, 11 Drawing Sheets

(56) References Cited

U.S. PATENT DOCUMENTS

| | | | | |
|---|---|---|---|---|
| 2014/0125625 A1* | 5/2014 | Su | ............................ | G06F 3/044 |
| | | | | 345/174 |
| 2014/0316729 A1* | 10/2014 | Kremin | .............. | G01R 27/2605 |
| | | | | 702/65 |
| 2015/0054754 A1* | 2/2015 | Han | ........................ | G06F 3/0418 |
| | | | | 345/173 |
| 2016/0117049 A1* | 4/2016 | Sagawai | ................ | G06F 3/0418 |
| | | | | 345/174 |
| 2016/0117051 A1* | 4/2016 | Han | ......................... | G06F 3/044 |
| | | | | 345/173 |
| 2016/0313823 A1* | 10/2016 | Tan | ........................ | G06F 3/0416 |
| 2018/0157354 A1* | 6/2018 | Blondin | ................. | G06F 3/0443 |
| 2018/0181258 A1* | 6/2018 | Lu | ............................ | G06F 3/044 |
| 2020/0136741 A1* | 4/2020 | Gharib | .................... | H04J 13/10 |

OTHER PUBLICATIONS

International Written Opinion for International Application No. PCT/US2019/034416, dated Aug. 26, 2019, 8 pages.

\* cited by examiner

*Spread signal with encoding*

*FIG. 8*

SPREAD ACQUISITION AND MEASUREMENT OF CAPACITANCE SENSORS AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/688,254, filed Jun. 21, 2018, the disclosure of which is hereby incorporated herein in its entirety by this reference.

TECHNICAL FIELD

Embodiments of the present disclosure relate, generally, to capacitive sensing, and more specifically, to spread acquisition and measurement techniques of sense channels of capacitive sensors, and related systems, methods and devices.

BACKGROUND

A typical touch interface system may incorporate touch sensors (capacitive, resistive, etc.) that respond to an object in close proximity to, or physical contact with, a contact sensitive surface of a touch interface system. The responses may be captured and interpreted to infer information about the contact, including a location on the interface. Touchpads used with personal computers, including laptop computers and keyboards for tablets, often incorporate or operate in conjunction with a touch interface system. Displays often include touch screens that incorporate elements (typically at least the touch sensor) of a touch interface system to enable a user to interact with a graphical user interface (GUI) and/or computer applications. Examples of devices that incorporate a touch display include portable media players, televisions, smart phones, tablet computers, personal computers, and wearables such as smart watches, just to name a few. Further, control panels for automobiles, appliances (e.g., an oven, refrigerator, laundry machine, etc.), security systems, automatic teller machines (ATMs), residential environmental control systems, and industrial equipment may incorporate touch interface systems, including to enable buttons, sliders, and other touch elements.

The inventors of this disclosure understand that displays, appliances, and moisture, by way of example, may introduce noise into a touch interface system, and noise coupling can cause unwanted mutual capacitance effects at the sensor and acquisition circuitry. Conventional touch interface systems may have other drawbacks and deficiencies.

BRIEF DESCRIPTION OF THE DRAWINGS

The purpose and advantages of the various embodiments of the disclosure will be apparent to one of ordinary skill in the art from the detailed description in conjunction with the appended figures:

FIG. 3 shows a representative diagram of the operation of a capacitive sensing system that incorporates acquisition and measurement techniques using contemporaneous acquisition and spreading codes, according to embodiments of the disclosure;

FIG. 4 shows a representative diagram of noise tolerance during operation of a capacitive sensing system that incorporates acquisition and measurement techniques using contemporaneous acquisition and spreading codes, according to embodiments of the disclosure;

FIG. 8 shows a representation of a force sensing operation, according to an embodiment of the disclosure.

DETAILED DESCRIPTION

Figure 1:
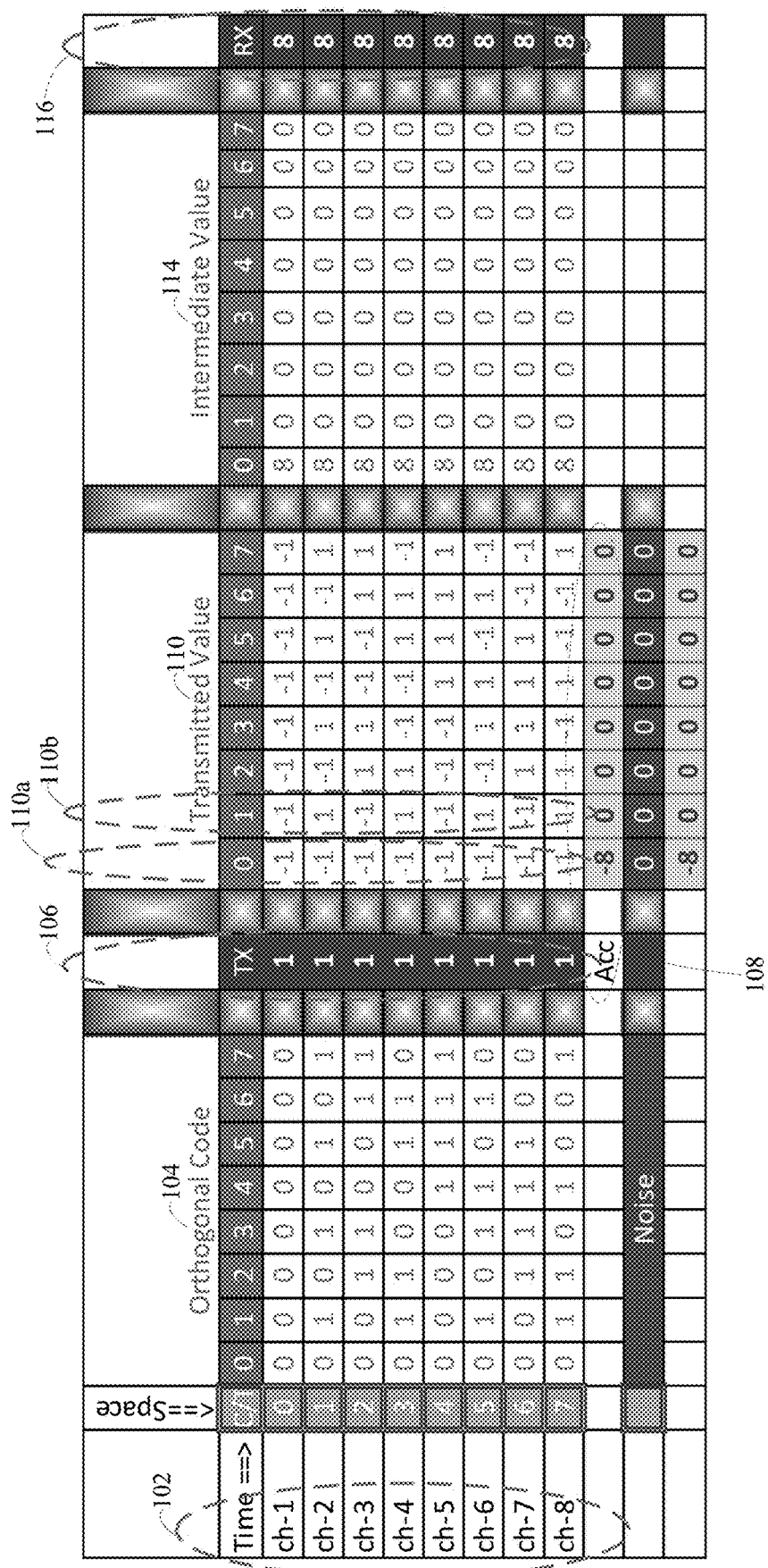
FIG. 1 shows a representative diagram of the operation of a touch system that incorporates acquisition and measurement techniques using contemporaneous acquisition and spreading codes, according to embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary,"

"by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As understood for purposes of the embodiments described in this disclosure, a capacitive sensor may respond to an object's (such as a finger or a stylus) contact with, or the object's proximity to, a contact-sensitive area of the capacitive sensor. In this disclosure "contact" and "touch" are meant to encompass both an object's physical contact with a contact-sensitive area and an object's presence within proximity of a contact-sensitive area without physical contact. Actual physical contact with a capacitive sensor is not required.

When an object contacts a capacitive sensor, a change in capacitance may occur within the touch sensor at or near the location of the contact. An analog acquisition front-end may "detect" the touch if it meets a certain threshold. "Charge-then-transfer" is a technique implemented in some touch-acquisition front-ends to detect capacitive changes, whereby a sensing capacitor is charged responsive to the change in capacitance (e.g., charged faster or slower) and the charge is transferred to an integrating capacitor over multiple charge-transfer cycles. The amount of charge associated with such a charge-transfer may be converted to digital signals by an analog-to-digital converter (ADC), and a digital controller may process those digital signals to determine measurements and if an object contacted the sensor.

Self-capacitance sensors are capacitive field sensors that detect/respond to changes in capacitance to ground. They are typically laid out in an array of rows and columns that react independently to a touch. By way of non-limiting example, a self-c sensor may include a circuit employing repetitive charge-then-transfer cycles using common integrated CMOS push-pull driver circuitry having floating terminals. Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance techniques may be used in the same touch interface, and complimentary to each other, for example, self-capacitance may be used to confirm a touch detected using a mutual capacitance.

Touch sensors may be overlaid in a 2-dimensional (2-D) arrangement for a 2-D contact sensitive surface that may be incorporated into a contact sensitive surface—for example, of a touch pad or a display screen—and may facilitate user interaction with an associated appliance. Insulating protective layers (e.g., resins, glass, plastic, etc.) may be used to cover touch sensors. As used herein, a "touch display" or "touch panel" is a display (such as a liquid crystal display (LCD), thin-film-transistor (TFT) LCD, or a light emitting diode (LED) display) that incorporates 2-D touch sensors.

Using the example of a touch screen that uses a matrix sensor approach of mutual capacitance sensors employing charge-transfer techniques, drive electrodes may extend in rows on one side of a substrate and sense electrodes may extend in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately measured or both measured in response to a capacitive change indicative of a touch event. For example, if a drive signal is applied to the drive electrode of row 2 and a sense electrode of column 3 is active then the node position is: (row 2, column 3). Nodes may be scanned by sequencing through different combinations of drive and sense electrodes. In one mode the drive electrodes may be driven sequentially while the sense electrodes are all continuously monitored. In another mode each sense electrode may be sampled sequentially.

Some touch interfaces incorporate force-sensing. Such "force-sensitive" interfaces may include sensors incorporated into, for example, a display or touchpad, to measure incremental differences in a distance between a surface and a feature beneath the surface. For example, as relative movement occurs the distance between a pair of electrodes may change, providing a measurable and/or change in capacitance. The change in capacitance may be used to estimate a force applied to the "force-sensitive surface" responsive to a magnitude of the change in capacitance. The location of the applied force on the force-sensitive surface may also be estimated, for example, responsive to one or more locations of electrode pairs of the force sensor that registered a changed in capacitance and/or a touch sensor also integrated with the interface.

By way of non-limiting example, microcontrollers, digital logic circuits, and/or configurable state machines may be implemented to control the drive electrodes and analyze the capacitive effects on a touch sensor and a force sensor. Integrated Circuit (IC) packages that include a microcontroller may provide the input and output pins to communicate with a host; as well as the firmware to perform techniques and operations, including those described herein, in connection with various embodiments. Examples of microcontrollers that may be used with the various embodiments of this disclosure may include, for example, peripheral interface microcontrollers, ARM-based microcontrollers, and AVR-8 and 32-bit microcontrollers.

By way of example, sense electrodes of a capacitive sensor may be operatively coupled to an acquisition front-end (for example, the charge integrator) by way of device I/O pins of a digital controller. The digital controller may be coupled to the acquisition front-end by way of ADC/DAC pins. The digital controller may include, e.g., a state machine (a collection of adders, flip-flops, and multiplexers that may form a digital logic circuit) configured to identify a contact and information about contact responsive to channel capacitance measurements.

In this disclosure, "contemporaneous acquisition" and "contemporaneously acquired" means acquisition, by analog circuitry and/or digital logic circuitry, of signals (analog or digital) indicative of sensed signals from multiple (e.g., two or more) sense channels of a capacitive sensor during the same acquisition cycle. The sensed signals may be, for example, charge flow from sense channels of a capacitive sensor to sampling circuitry, a charge to voltage converter, or both. A measurable signal may be a voltage, a current, a resistance, a capacitance, or combinations thereof. The sensed signals from multiple sensor channels may be acquired at the same acquisition circuitry or more than one acquisition circuitry. The embodiments described in this disclosure assume that the sensed signals are acquired at the same acquisition circuitry, but, as noted above, that is not a requirement of the disclosure. Use of the past tense "acquired" as in "contemporaneously acquired" is not intended to require the completion of a contemporaneous acquisition, and can include any point in time or operation during a contemporaneous acquisition.

References to channel capacitance include both absolute channel capacitance and a change(s) in channel capacitance. A channel capacitance measurement or capacitive measurement includes any value that is indicative of a channel capacitance.

In this disclosure, "spreading code" means an N-bit coded data stream at a data rate (i.e., a frequency that may also be characterized herein as an encoding rate). The encoding rate is typically a multiple of N×the data rate of the data that is being encoded. In the digital domain each bit of the spreading code is a logical '0' or a logical '1'. For example, an 8-bit spreading code may be '0101 0101'. For purpose of consistency and ease of explanation, spreading codes are discussed in the digital domain, but they may also be analog signals with an amplitude and a frequency.

Some spreading codes may be orthogonal to other spreading codes, that is, the cross-correlation of the two spreading codes is essentially zero (i.e., they do not interfere with each other). One property of orthogonal spreading codes is that the dot product of the two spreading codes is zero.

Figure 9A:
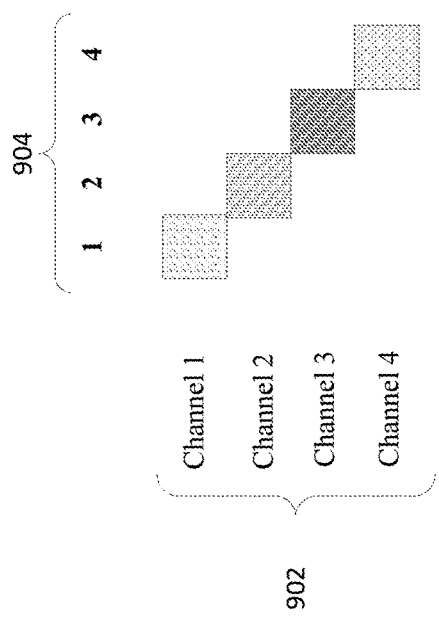
FIGS. 9A and 9B show capacitive sensing acquisition processes according to the state of the art.

One conventional capacitive measurement technique is to proceed channel by channel, as shown in FIG. 9A. Measurements are taken one sense channel at a time for each of the channels 902, sequentially, with each cycle 904. So, channel 1 is measured at cycle 1, channel 2 is measured at cycle 2, channel 3 is measured at cycle 3, and channel 4 is measured at cycle 4. Channel-by-channel measurement is fast (4 channels in 4 cycles), but there is little noise tolerance built into the measurement process, itself.

Figure 9B:
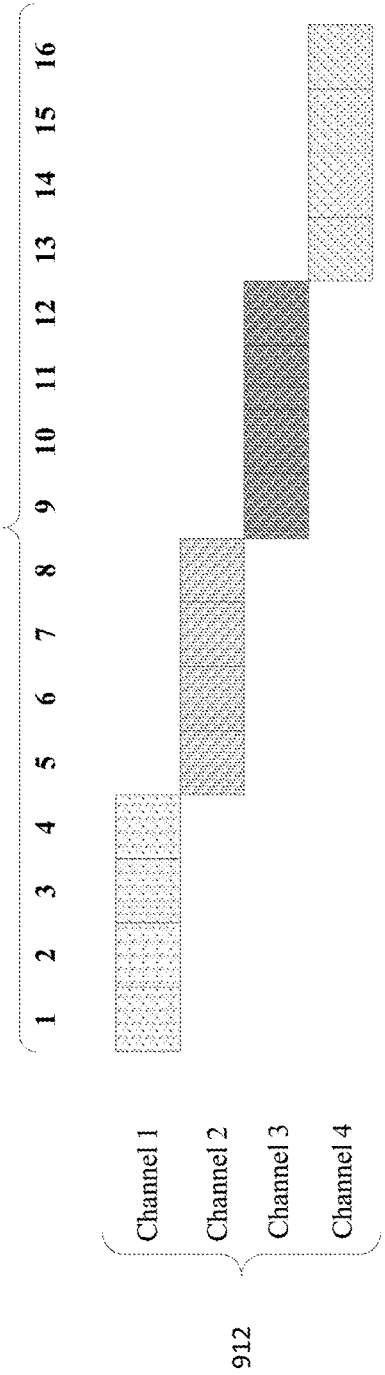

One technique to improve SNR is to average multiple measurements from each channel, as shown in FIG. 9B. So, channel 1 is measured 4 times, channel 2 is measured 4 times, and so on. Averaging N measurements per channel, for Gaussian distributed noise, results in a $\sqrt{N}$ improvement in SNR for each channel (which may also be characterized as a $\sqrt{N}$ reduction in noise). However, as shown in FIG. 9B, the measurements are still taken sequentially (i.e., proceeding channel by channel), and so the acquisition speed is slower than techniques that do not use averaging. Notably, FIG. 9B shows acquisition from 4 channels 912 in 16 cycles 914 as compared to acquisition from 4 channels in 4 cycles shown in FIG. 9A. Such a long acquisition period is detrimental for touch panel parsing speed. Description of the measurement of channels as "sequential" or in some order is not intended to mean that the channels are adjacent (or that sense lines are adjacent), nor is it intended to mean that the disclosure requires sensed signals to be acquired in a specific order or channel measurements be taken in any order.

Some embodiments of the disclosure relate, generally, to contemporaneous acquisition of sensed signals at multiple sensor channels of a capacitive sensor, and applying spread encoding to the contemporaneously acquired sensed signals. The spread encoded signals may be decoded and processed by a touch processor. Spread encoding the acquired signals improves noise tolerance of a touch interface. Accordingly, one or more embodiments of the disclosure relate to a noise-tolerant touch acquisition system.

One advantage of contemporaneously acquiring sensor signals and using spread encoding is that it decouples, to varying degrees, the tradeoff between parsing speed and the SNR. In other words, given a single channel acquisition system having a signal-to-noise-ratio of $SNR_1$, a system implementing N channel acquisition according to embodiments of the disclosure will have a signal-to-noise-ratio of $SNR_N = sqrt(N)*SNR_1$ which may also be characterized as an sqrt (N) reduction in noise. Thus, the signal-to-noise-ratio of an embodiment of an 8-channel system that implements embodiments of this disclosure may have an SNR of sqrt (8)*$SNR_1$, as compared to a single channel acquisition system, but without a corresponding drop in parsing speed, which may also be characterized as a decrease in the refresh rate.

Moreover, a capacitive sensing system that incorporates the acquisition and/or measurement techniques of this disclosure may achieve the same SNR performance as a single channel acquisition system, but with $\sqrt{N}$ the number of channels. For example, a 16×16 channel touch panel that incorporates capacitive sensing according to embodiments of the disclosure may achieve 16 times the refresh rate as a 16×16 channel touch panel that incorporates single channel acquisition techniques. In other words, a 16×16 channel touch panel according to embodiments of the disclosure has a 160 Hz refresh rate as compared to a 10 Hz refresh rate for the 16×16 channel touch panel that uses conventional single-channel acquisition techniques.

In various embodiments, the selected spreading codes are orthogonal in order to permit better differentiation of the contributing sensed signals to the accumulated signals. In other words, if there are three spreading codes, each spreading code is orthogonal to the other two spreading codes. Generally, the number of spreading codes used will be the same as the number of channels of a touch sensor that are being contemporaneously acquired.

FIG. 1 shows an operation of a capacitive sensor that incorporates acquisition and measurement techniques according to one or more embodiments of the disclosure. In this example, sensed signals (e.g., charge) at channels 102 (i.e., Ch. 1 to Ch. 8) are contemporaneously acquired over 8 acquisition cycles. In this example, there are no changes in capacitance. Tx value 106 is indicative of the baseline channel capacitance (e.g., no touches at a touch panel.). Here, the charge on each channel is indicative of the magnitude of a drive signal supplied to drive lines.

Each bit of orthogonal spreading codes 104 is applied to channels 102 during each acquisition cycle. For example, code '0000 0000' is applied to the sensed signal from Ch. 1, the code '0101 0101' is applied to Ch. 2, and so on, with each successive bit (from left to right) applied during each acquisition cycle. So, when the orthogonal spreading code 104 of '0000 0000' is convoluted with the Tx value 106 of Ch. 1 (a '1') over eight acquisition cycles, the encoded Tx encoded value 110 corresponding to Ch. 1 is '−1 −1 −1 −1 −1 −1 −1 −1', when the code '0101 0101' is convoluted with the Tx value 106 of Ch. 2 (a '1'), the encoded Tx value 110 corresponding to Ch. 2 is '−1 1 −1 1 −1 1 −1 1', and so on.

Each bit in an encoded Tx value 110 of a channel represents a positive or negative contribution to the value accumulated at an acquisition circuitry. Thus, the contribution of the first bit 110a of the Tx value 110 for each channel may be accumulated as '−8' or (−1)+(−1)+(−1)+(−1)+(−1)+(−1)+(−1)+(−1)=−8, the contribution of the next bit 110b of the Tx value 110 for each channel may be accumulated as a '0' or (−1)+(1)+(−1)+(1)+(−1)+(1)+(−1)+(1)=0, and so on. The encoded accumulated Tx value 108 that is ultimately transmitted to the digital controller is '−8 0 0 0 0 0 0 0'.

The encoded accumulated Tx value 108 may be decoded responsive to the orthogonal spreading codes 104 to arrive at encoded intermediate value 114 for each sense channel. So, the encoded intermediate value 114 for Ch. 1 is '8 0 0 0 0 0 0 0', the encoded intermediate value 114 for Ch. 2 is '8 0 0 0 0 0 0 0', and so on. A received value (Rx value) 116 may be decoded responsive to the encoded intermediate value 114 for each channel. In one or more embodiments, the Rx value 116 is determined by summing each entry of the encoded intermediate value 114, for example, the Rx value 116 for Ch. 1 is 8, the Rx value 116 for Ch. 2 is 8, and so on. By a predefined convention implemented in this example, '8' corresponds to a logical '1' and '−8' corresponds to a logical '0'. Thus, the Rx value 116, in this example, correspond to '1111 1111', which is the same as the Tx value 106, or, using a touch example, no touch. One of ordinary skill in the art would understand that other conventions may be implemented.

Figure 2:
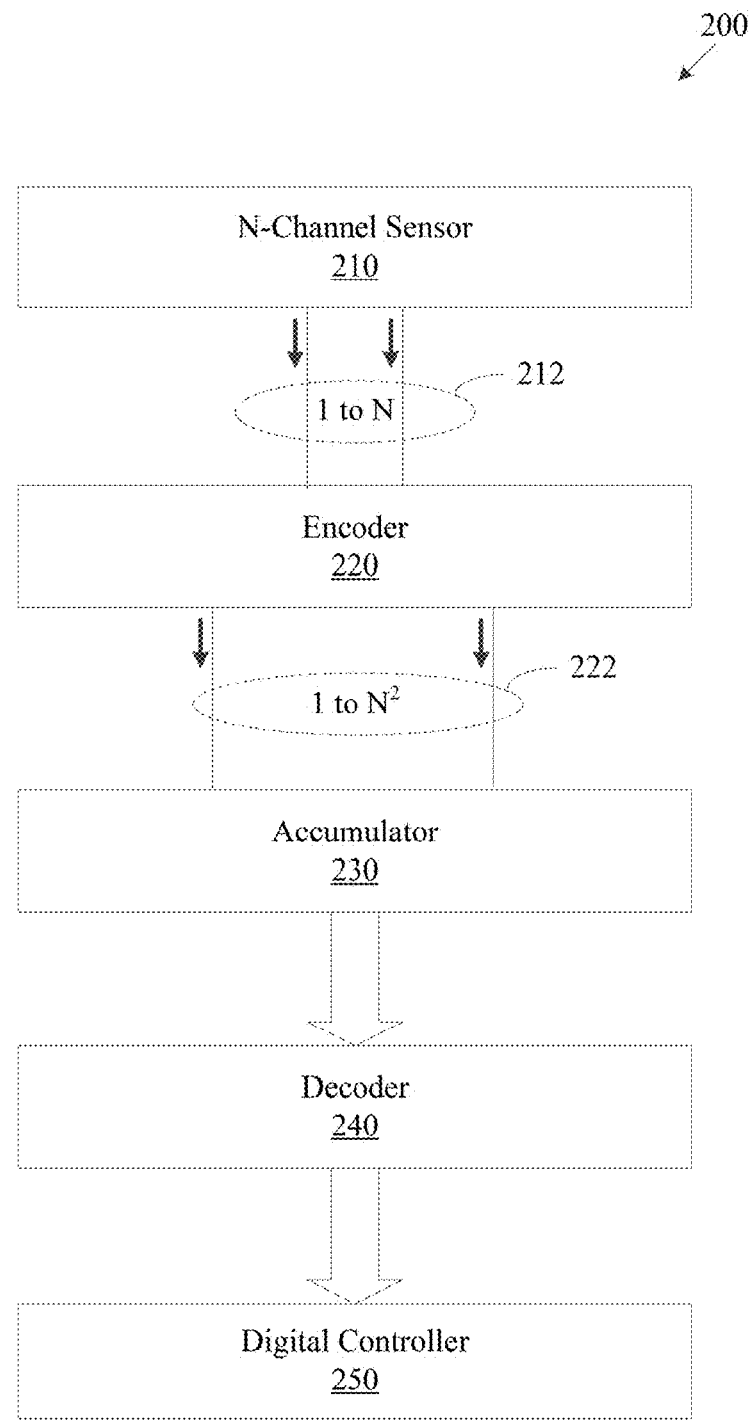
FIG. 2 shows a capacitive sensing system that incorporates encoding techniques in acquisition and measurement according to embodiments of the disclosure.

FIG. 2 shows a system diagram of an embodiment of a capacitive sensing system 200, in accordance with one or more embodiments of the disclosure. Encoder 220 may be operatively coupled to sense channels 212 of N-channel sensor 210, and may be configured to encode contemporaneously acquired sensed signals at the 1 to N sense channels 212 (e.g., modulate the signals). In one or more embodiments, the encoder 220 may comprise N encoders, and each such encoder may be configured to encode an assigned channel of the N-channel sensor 210 responsive to a spreading code. In one or more embodiments, encoder 220 may be a digital logic circuit configured to implement the convolution of spreading codes with the sensed signals. In one or more embodiments, each spreading code may be implemented as a digital circuit. In another embodiment, a generic digital circuit may be configured to implement the convolution responsive to one or more spreading codes.

Accumulator 230 may be operatively coupled to encoder 220 and configured to receive encoded 1 to N sensed signals. In one or more embodiments, accumulator 230 may include a charge-to-voltage converter (not shown) that is configured to accumulate charge and output a voltage responsive to the charge. In one or more embodiments, accumulator 230 may include charge-then-transfer circuitry that accumulates charge at integration capacitor(s) and outputs discrete voltages faster or slower responsive to a channel capacitance and/or change in channel capacitance.

Decoder 240 may be operatively coupled to accumulator 230. Decoder 240 may be configured to receive spread encoded analog or digital signals from accumulator 230 (for example, coupled to an output of a charge to voltage converter, coupled to an output of an analog-to-digital converter, etc.), decode the received signals responsive to one or more spreading codes, and output decoded signals. Decoder 240 may be configured to decode the encoded accumulated signals and generate encoded intermediate values that are indicative of the contribution of each channel to the encoded accumulated values. Each such encoded intermediate value for each channel may be generated over successive acquisition cycles.

In one or more embodiments, decoder 240 may be hardware or digital circuitry coupled to digital controller 250. In another embodiment, decoder 240 may be implemented in software, for example, in the software of digital controller 250.

In one or more embodiments, encoder 220, accumulator 230, and decoder 240 may form acquisition circuitry for capacitive sensing system 200, for example, a front-end acquisition circuitry. In another embodiment, encoder 220 and accumulator 230 may form acquisition circuitry for capacitive sensing system 200 and decoder 240 may be implemented at the digital controller 250, for example, in software.

Digital controller 250 may be operatively coupled to decoder 240, and may be configured to determine a channel capacitance measurement for one or more channels responsive to encoded intermediate values. In one or more embodiments, digital controller 250 may include one or more touch processors (not shown) configured to determine touch information responsive to channel capacitance measurements. For example, a location (e.g., x-y-location, pixel location, etc.) of a touch at a contact sensitive surface (not shown) operatively coupled to the N-channel sensor 210. In one or more embodiments, digital controller 250 may be configured to provide touch information to an interface (not shown) for a data bus (not shown), for example a universal asynchronous receiver-transmitter (UART), universal synchronous/asynchronous receiver-transmitter USART, or inter-integrated circuit (I²C). In one or more embodiments, the data bus may be a peripheral data bus operatively coupled to a microcontroller, and one or more of accumulator 230, encoder 220, and digital controller 250 may be part of an integrated circuit package together with the microcontroller.

Figure 3:
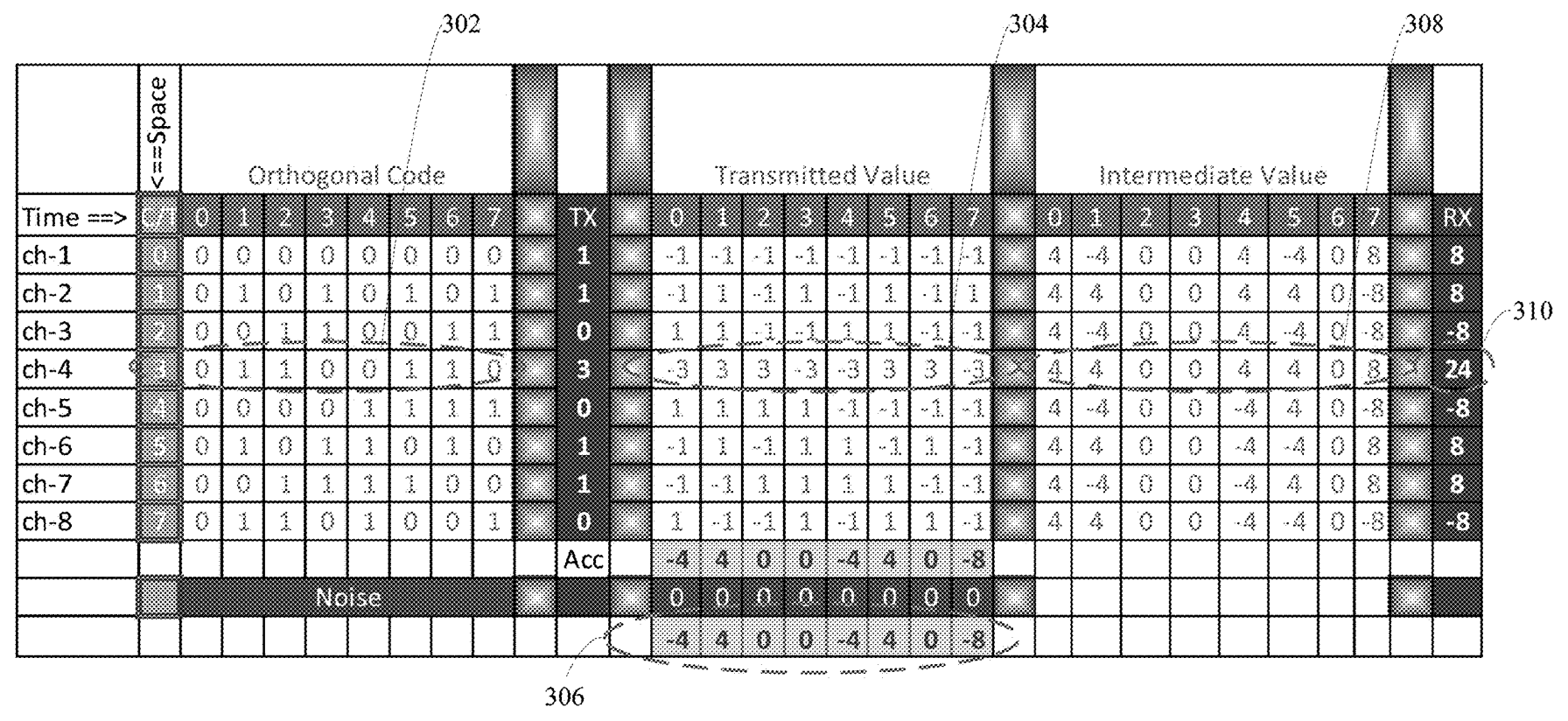

FIG. 3 shows an example measurement that may be performed at a capacitive sensing system 200, according to one or more embodiments of the disclosure. In this example, charge is accumulated from Ch. 4 responsive to a channel capacitance change. A channel capacitance is represented, here, as a '3'. The encoder 220 applies the spreading code 302 of '0110 0110' to Ch. 4, and the result is a spread encoded value 304 of '−3, 3, 3, −3, −3, 3, 3, −3'. The spread encoded value 304 is accumulated with the spread encoded values associated with the other channels, and the spread encoded accumulated Tx value 306 is '−4, 4, 0, 0, −4, 4, 0, −8'. Decoder 240 decodes the Tx value 306 responsive to the spreading codes used to encode each channel and constructs spread encoded intermediate values that are indicative of each channel's contribution to the accumulated values. The spread encoded intermediate value 308 for Ch. 4 is '4, 4, 0, 0, 4, 4, 0, 8'.

The digital controller 250 decodes each encoded intermediate value it receives by summing the values of each bit of the intermediate encoded value to determine a received value for each sensed channel. Here, the channel capacitance measurement 310 for Ch. 4 determined responsive to the intermediate encoded value is '24.'

In the case of a touch application, a touch processor (not shown) may be configured to compare the channel capacitance measurements for each channel to one or more thresholds, and, responsive to the comparison, determine touch information (e.g., if a touch occurred, where it occurred (e.g., x- and y-coordinates), when it occurred (e.g., a counter), as well as other touch information).

Figure 4:
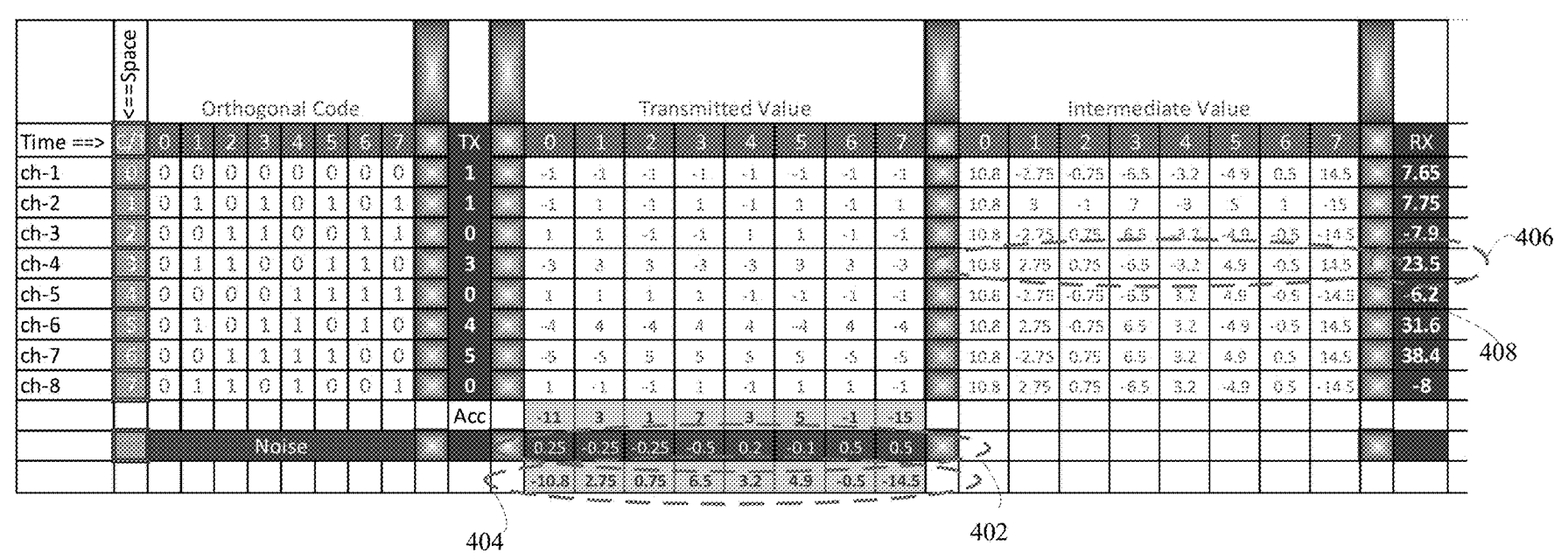

FIG. 4 shows an example of the noise tolerance of a capacitive sensing system 200, according to one or more embodiments of the disclosure. Here, noise 402 is transmitted with the encoded accumulated Tx values 404. The noise 402 may be the result of, for example, unwanted capacitive coupling with other subsystem, power supplies, moisture, etc., that affect measurement of channel capacitance by a capacitive sensing system. As shown in FIG. 4, due to the noise 402, the encoded accumulated Tx values 404 do not exactly match what would be transmitted in a 100% noise immune capacitive sensing system. Nevertheless, the measurement 406 for Ch. 4 determined by the digital controller 250 responsive to the intermediate values 408 includes only a small amount of error (24−23.5=0.5) due to the noise 402.

Figure 5A:
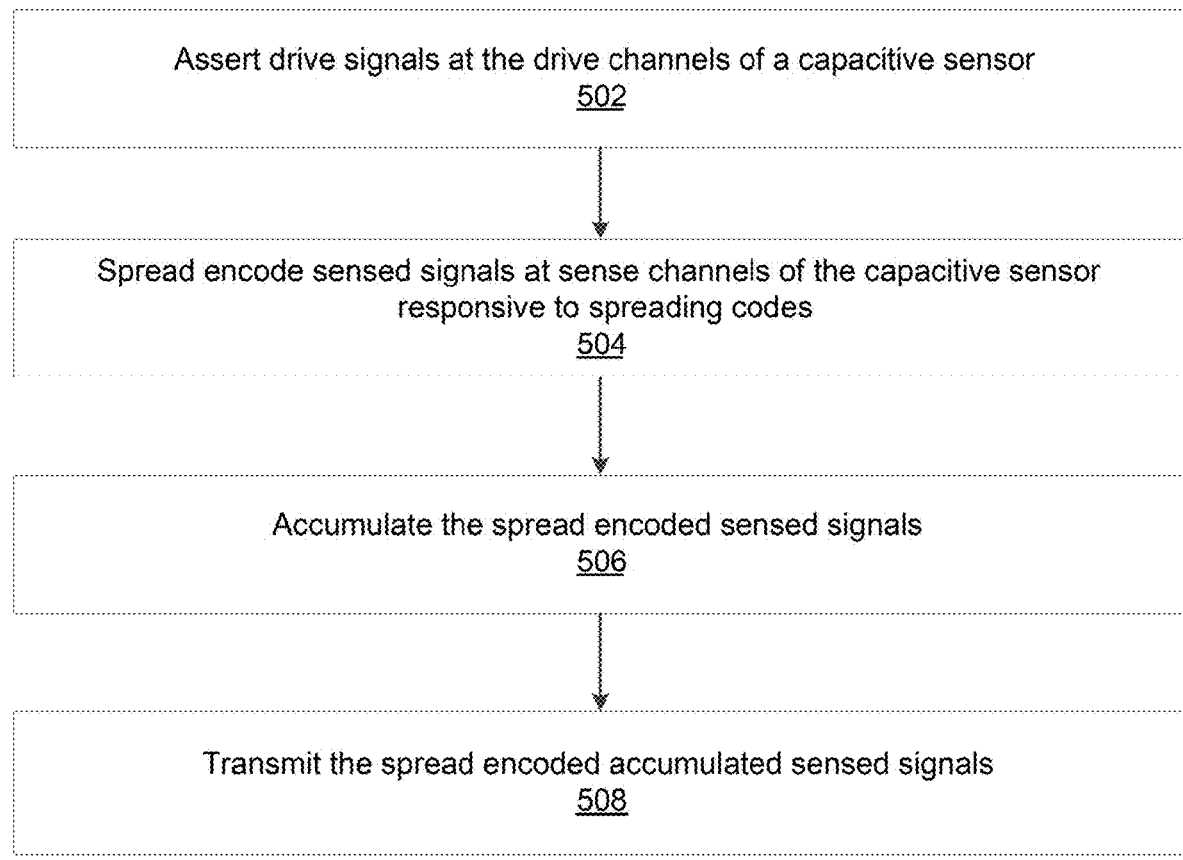
FIG. 5A shows a flowchart of a capacitive sensing acquisition process that incorporates spreading techniques, according to embodiments of the disclosure.

FIG. 5A shows a flowchart of an acquisition process with encoded sense channels of a capacitive sensing system, according to embodiments of the disclosure. In operation 502, drive signals are asserted at the drive channels of a capacitive sensor. In one or more embodiments, the drive signals may be indicative of a sensing operation performed at the capacitive sensing system. The drive signals may be asserted for multiple acquisition cycles, which form a contemporaneous acquisition period. In operation 504, sensed signals at N sense channels of the capacitive sensor are spread encoded responsive to spreading codes. In one or more embodiments, a different N-bit spreading code is applied to each sense channel, and each spreading code is orthogonal to the other spreading codes. In one or more embodiments, a sensed signal is spread over a bit of the applicable spreading code per acquisition cycle. In operation 506, N spread encoded bits, each corresponding to a different channel, are accumulated. In operation 508, the current spread encoded accumulated bit is transmitted, e.g., to the digital controller 250. Each acquisition cycle, the sensed signals are spread over an additional bit of spreading code until, after a contemporaneous acquisition period worth of acquisition cycles, the sensed signals have been spread across the entire spreading code, accumulated, and transmitted.

Figure 5B:
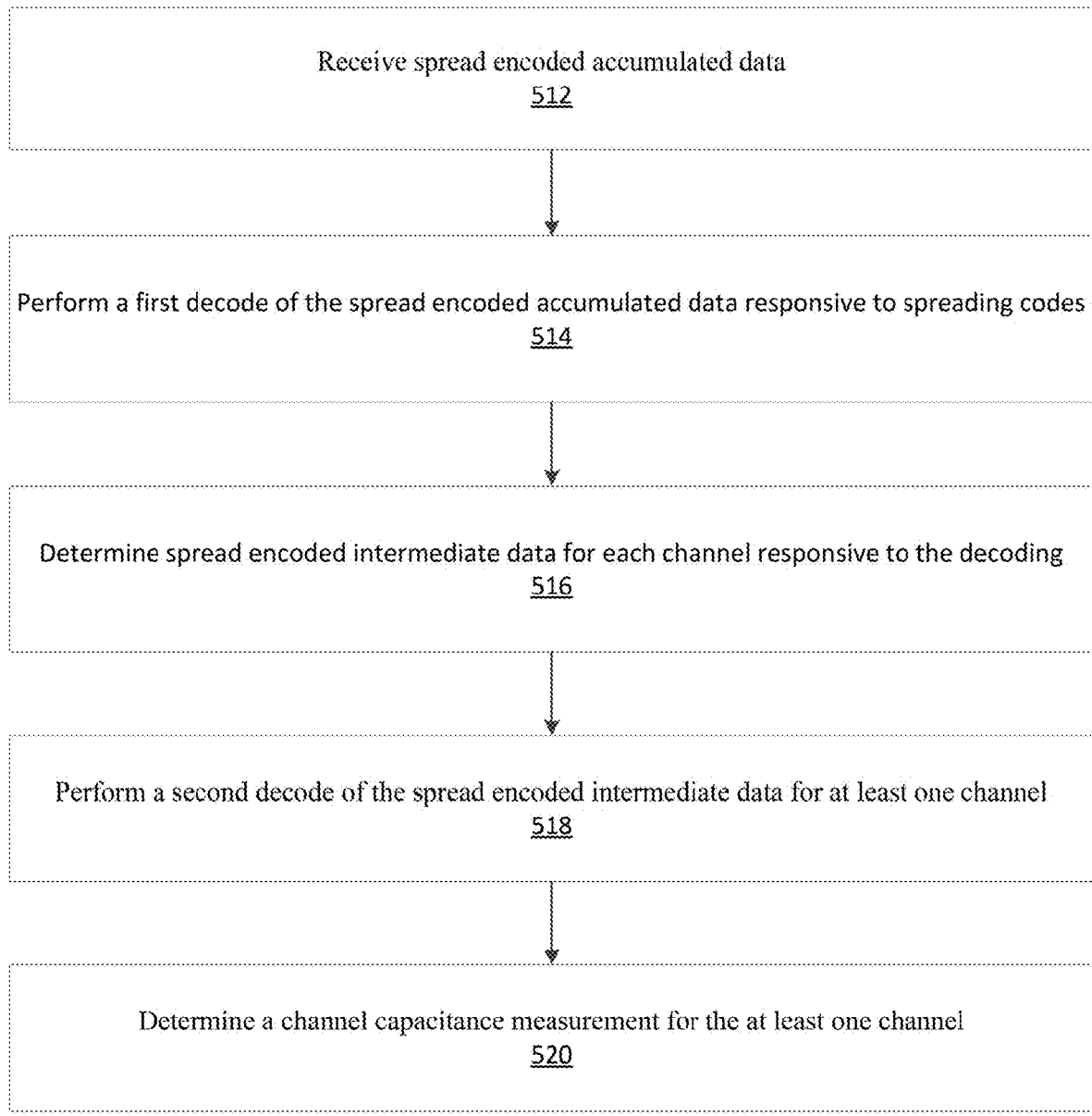
FIG. 5B shows a flowchart of a capacitive sensing acquisition process that incorporates spreading techniques, according to embodiments of the disclosure.

FIG. 5B shows a flowchart of a process for decoding spread encoded sensed signals and using the decoded signal to determine a channel capacitance measurement, according to embodiments of the disclosure. In operation 512, the spread encoded accumulated value is received. In operation 514, the spread encoded accumulated value is decoded responsive to the spreading codes. In operation 516, encoded intermediate value for each channel is determined responsive to the decoding. In one or more embodiments, a decode operation is applied that is the logically opposite of the encoding sequences applied at each channel to encode the transmit value to arrive at each intermediate value. In operation 518, intermediate value is further decoded for at least one channel. In one or more embodiments, each bit of the encoded intermediate value is summed with the other bits. In operation 520, a channel capacitance measurement is determined responsive to the decoding.

Noise may also be introduced to the drive or sense lines of a capacitive sensing system. Accordingly, in some embodiments of the disclosure, the drive signals are encoded using orthogonal spreading codes and modulated over a number of frequencies, and then drive lines are driven using the encoded and frequency spread drive signals. A de-spreader and a decoder de-modulate and decode the sensed signals before transmitting to a digital controller.

Figure 6:
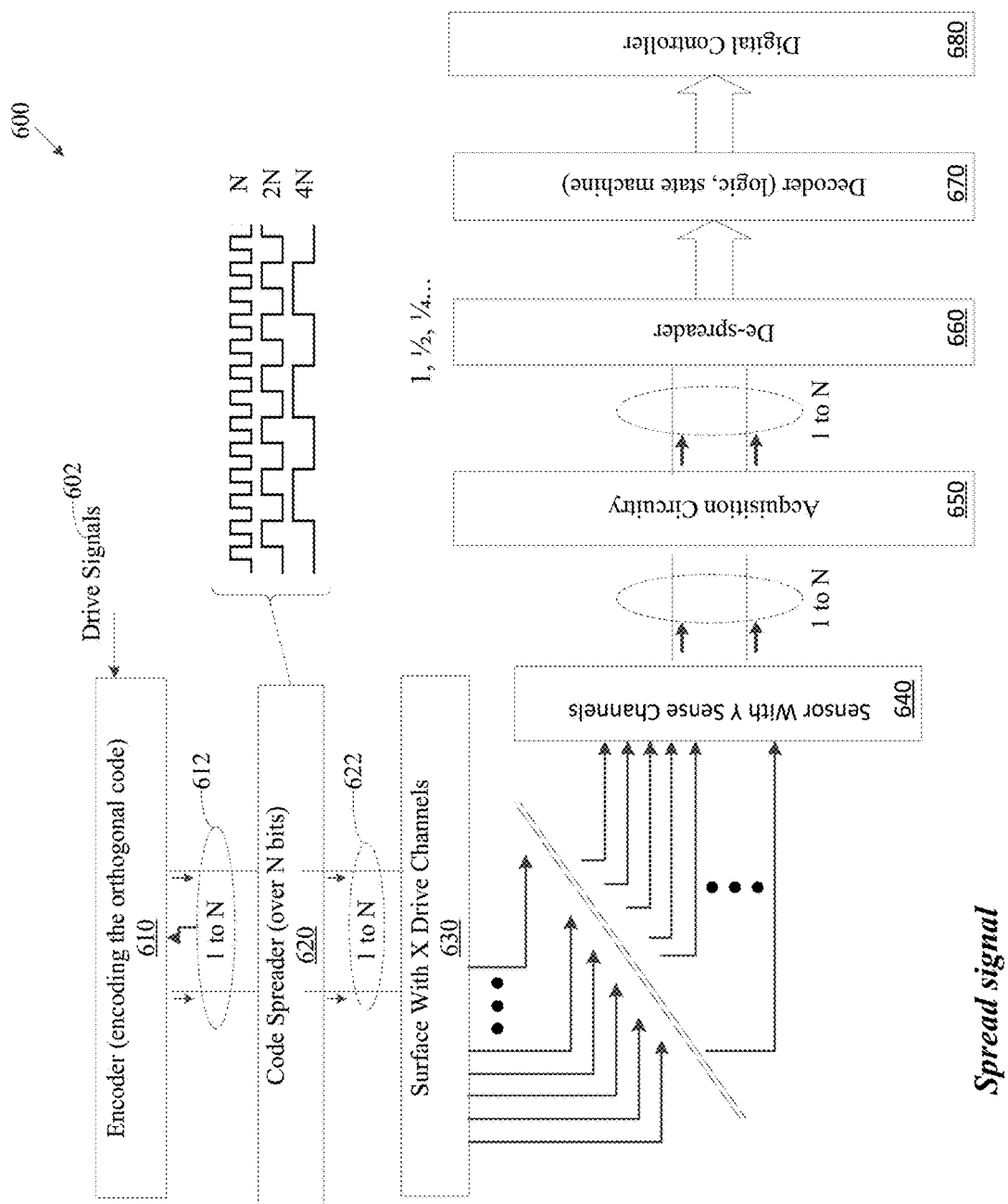
FIG. 6 shows a capacitive sensing system that incorporates encoding and frequency spreading techniques in acquisition and measurement according to embodiments of the disclosure.

FIG. 6 shows a capacitive sensing system that incorporates spread encoding according to one or more embodiments of the disclosure. The capacitive sensing system 600 includes, on the drive side, an encoder 610, a code spreader 620, and a surface with drive channels 630. The encoder 610 may be configured to encode drive signals 602 responsive to spreading codes. For each acquisition cycle, the encoder 610 may be configured to encode a drive signal for a channel with an additional bit of an applicable spreading code. The code spreader 620 may be operatively coupled to the encoder 610 and configured to modulate each spread encoded drive signal responsive to a transmit frequency associated with the channel (e.g., Fx, ½Fx, ¼Fx, etc.). For example, the code spreader 620 may spread "1010" as "1010" responsive to an Fx transmit frequency, "1010" as 1111 0000 1111 0000" responsive to a ½ Fx transmit frequency, and '1010' as '1111 1111 0000 0000 1111 1111 0000 0000' responsive to a ¼ Fx transmit frequency. The code spreader 620 may be operatively coupled to the drive channels of a surface with drive channels 630, and configured such that the encoded and frequency spread drive signals may be asserted at the drive channels.

The sense side of the capacitive sensing system 600 includes a sensor with Y sense channels 640, acquisition circuitry 650, a de-spreader 660, a decoder 670, and a digital controller 680. In one or more embodiments, the decoder 670 may be part of the digital controller 680, for example, a process executing in firmware or circuitry. The acquisition circuitry 650 may be operatively coupled to the sense channels 640 and configured to contemporaneously acquire sensed signals from the sense channels 640, including signals indicative of channel capacitance and changes in channel capacitance. The de-spreader 660 may be operatively coupled to the acquisition circuitry 650 and configured to frequency demodulate the encoded and spread sensed signals accumulated at the acquisition circuitry 650. The de-spreader 660 may be operatively coupled to the decoder 670, and the decoder 670 may be configured to decode the encoded accumulated signals responsive to the orthogonal spreading codes used to encode the drive lines. The result of the decode may be an encoded intermediate value or data for each channel. The decoder 670 may be configured to further decode the intermediate value and determine a value indicative of the channel capacitance for each sense channel of the sense channels 640. The digital controller 680 may be configured to further process the channel capacitance values and, for example, determine touch information responsive to the channel capacitance values.

While acquisition circuitry 650, de-spreader 660 and decoder 670 are described as independent units, in one or more embodiments, de-spreader 660, decoder 670, and an accumulator (not shown) may, together, form acquisition circuitry 650. One or more embodiments may implement analog-to-digital (ADC) conversion at different stages, for example, after charge accumulation, after de-spreading, or after decoding. Further, in one or more embodiments, one or more of the de-spreader 660 and decoder 670 may be implemented at the digital controller 680, e.g., in software executed by a microprocessor.

In one or more embodiments, one or more of the de-spreader 660, decoder 670, and digital controller 680 may be implemented as part of a microcontroller with a memory, microprocessor, input/output ports, and, optionally, one or more peripherals. In another embodiment, one or more of the de-spreader 660, decoder 670, and digital controller 680 may be implemented as hardware circuitry or digital circuitry of a peripheral, or, if a peripheral is implemented at a microprocessor, then software.

Figure 7A:
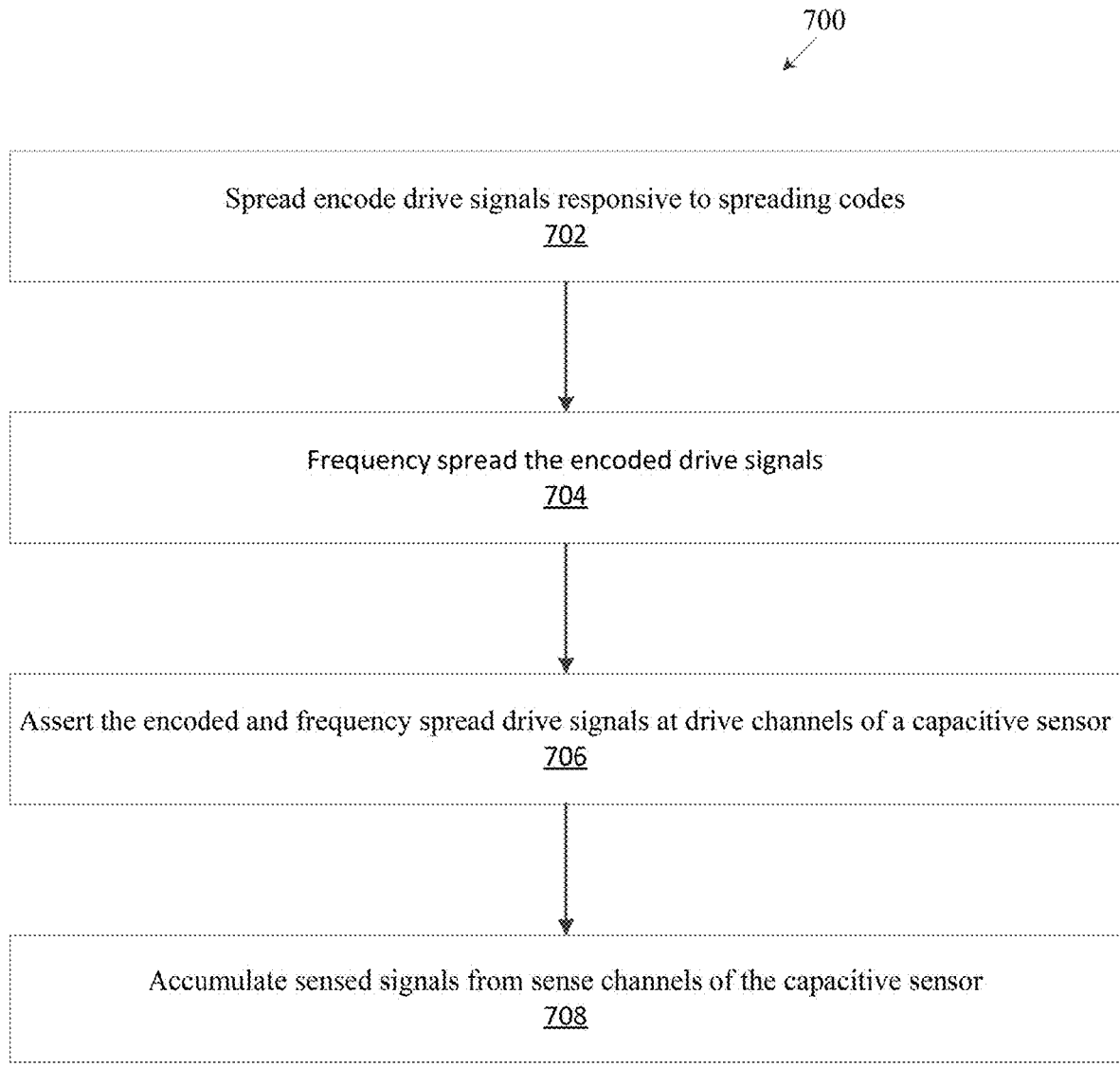
FIG. 7A shows a flowchart of a capacitive sensing acquisition process that incorporates encoding and frequency spreading techniques, according to embodiments of the disclosure.

FIG. 7A shows a flowchart of an encoded drive process 700 for encoding sense channels of a capacitive sensing system, according to embodiments of the disclosure. In operation 702, drive signals are spread encoded responsive to spreading codes. In one or more embodiments, each drive signal is configured to be asserted at a different drive channel of a capacitive sensor. A different N-bit spreading code is applied to each drive signal, and each spreading code is orthogonal to the other spreading codes. In one or more embodiments, a drive signal is spread over a bit of an applicable spreading code per acquisition cycle. Information about the acquisition cycle or acquisition cycles over which the drive signals will be spread encoded may be provided. In operation 704, drive signals are frequency spread responsive to transmit frequencies associated with the drive channels. In operation 706, the encoded and frequency spread drive signals are asserted at the drive channels of the capacitive sensor. In operation 708, sensed signals are accumulated from sense channels of the capacitive sensor.

Figure 7B:
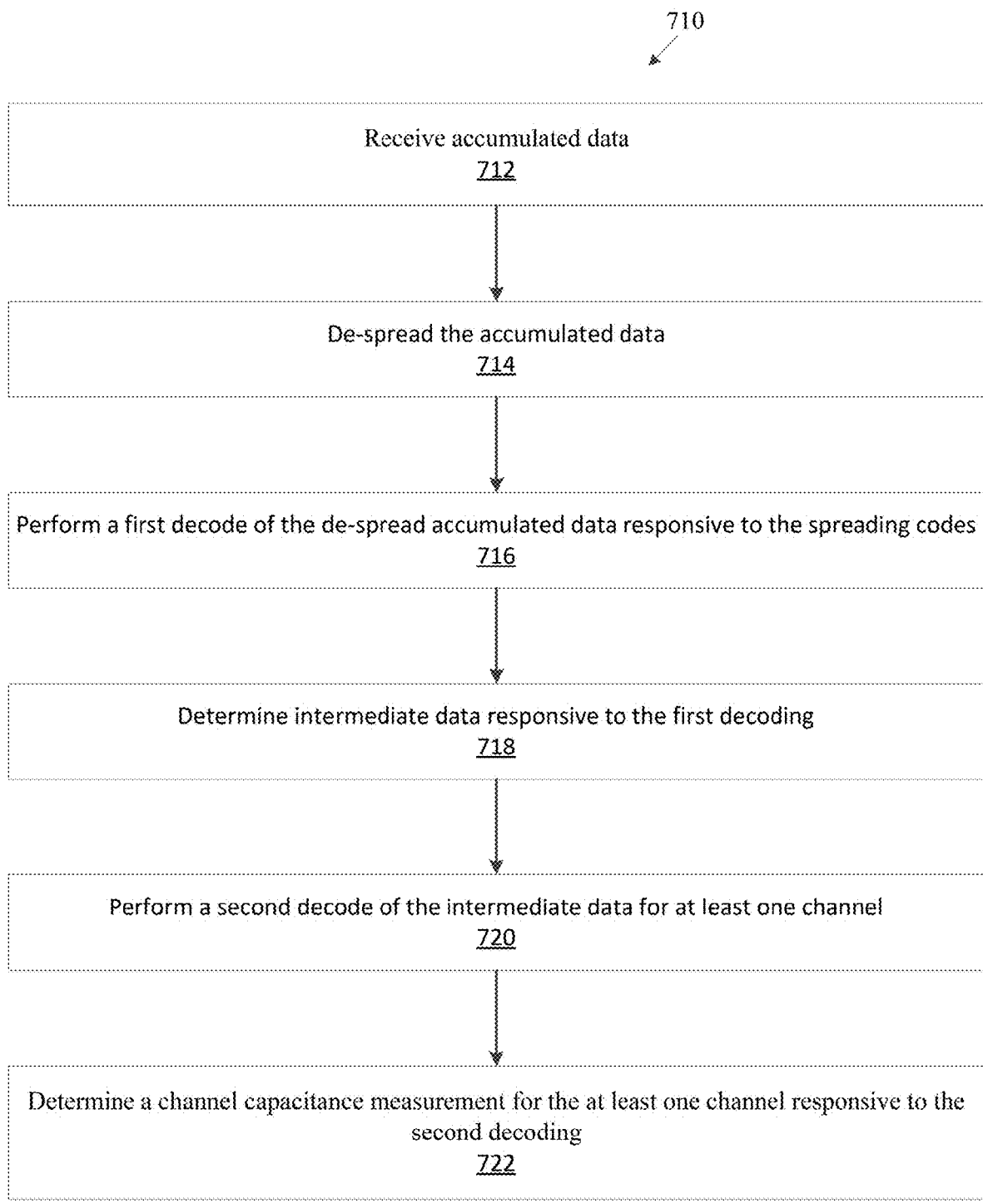
FIG. 7B shows a flowchart of a capacitive sensing acquisition process that incorporates encoding and frequency spreading techniques, according to embodiments of the disclosure.

FIG. 7B shows a flowchart of a spread acquisition process 710 for decoding accumulated sensed signals generated responsive to frequency spread and encoded drive signals, and using the result to determine a channel capacitance measurement, according to embodiments of the disclosure. In operation 712, the frequency spread encoded accumulated sensed signals are received. Notably, due to the frequency spreading, it may take $N*f_{ratio}$ to receive all of the accumulated sensed signals, where $f_{ratio}$ is the ratio of the most spread signal to a unity signal (i.e., 1, 2, 4, etc.). In operation 714, the accumulated sensed signals are demodulated (which may also be characterized in this disclosure as "de-spread"). In one or more embodiments the accumulated sensed signals may be converted to digital signals before being demodulated. In operation 716, a first decode of the demodulated sensed signals is performed responsive to the spreading codes used to encode the drive signals. In one or more embodiments, encoded intermediate values are generated responsive to a decode operation applied to the accumulated sensed signals, where the decode operation may be logically opposite of the encoding sequences applied at each channel to encode the drive signals. In operation 718, an encoded intermediate signals are determined responsive to the first decoding. In operation 720, another decode is performed of the intermediate data for at least one channel. In one or more embodiments, the other decode may comprise summing the bits of the intermediate data. In operation 722, a channel capacitance measurement is determined for the at least one channel responsive to the second decoding.

Figure 8:
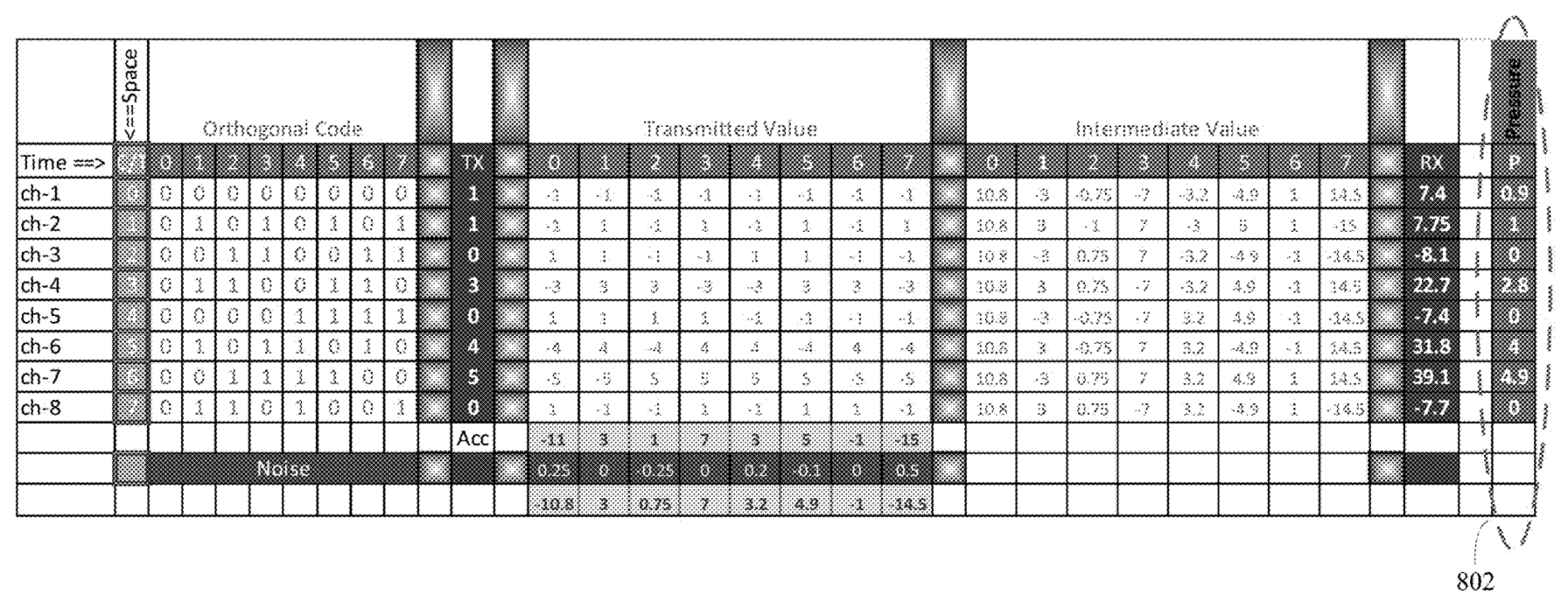

Embodiments of capacitive sensing systems described in this disclosure may be incorporated into touch interfaces that are configured to perform touch processing and force processing. FIG. 8 shows force sensing in a noise tolerant touch interface according to an embodiment of the disclosure. Pressure measurements 802 (i.e., force) are determined by further processing the capacitance measurements that were based on the sensed signals.

One of ordinary skill in the art will appreciate that embodiments of the disclosure may be applied to more than converting change in capacitance to voltage, for example, the same principles apply to using change in charge to determine frequency and change in charge to determine current. Thus, touch embodiments of the present disclosure not limited to touch controllers that measure voltage to detect contact, but also apply to touch controllers that measure frequency and current (or changes in frequency and/or current).

One of ordinary skill in the art will recognize that embodiments of the disclosure have many benefits and advantages in addition to overcoming deficiencies of some conventional acquisition techniques. For example, as compared to conventional acquisition techniques, embodiments may enable a parsing speed improvements and therefore ability to parse larger panels within the same time constraints as conventional acquisition techniques; a signal-to-noise ratio improvements and therefore operating at the same parsing speed achieved with conventional single channel acquisition but higher noise immunity; and power saving improvements because operating faster allows use of a device for shorter periods and less power consumption over time.

Many of the functional descriptions in this specification may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented using software or firmware, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Additional non-limiting embodiments of the disclosure include:

Embodiment 1: a capacitive sensing system, comprising: a sensor circuitry comprising sense lines; an acquisition circuitry operatively coupled to the sense lines, wherein the acquisition circuitry is configured to receive sensed signals indicative of one or more capacitances at the sensor circuitry and provide accumulated divided sensed signals responsive to the sensed signals; and a digital controller operatively coupled to the acquisition circuitry and configured to determine a channel capacitance measurement responsive to the accumulated divided sensed signals.

Embodiment 2: the system of Embodiment 1, wherein the acquisition circuitry is configured to: receive the sensed signals at the sense lines; divide the sensed signals; and accumulate the divided sensed signals.

Embodiment 3: the system according to any of the previous Embodiments, wherein the acquisition circuitry is configured to divide the sensed signals by spreading the sensed signals responsive to one or more spreading codes.

Embodiment 4: the system according to any of the previous Embodiments, wherein at least one spreading code of the one or more spreading codes is a binary code comprising two or more bits.

Embodiment 5: the system according to any of the previous Embodiments, wherein the acquisition circuitry is configured to receive the sensed signals during an acquisition period, the acquisition period comprising two or more acquisition cycles.

Embodiment 6: the system according to any of the previous Embodiments, wherein the sense lines comprise a first sense line, and the acquisition circuitry is configured to: receive first sensed signals of the sensed signals at the first sense line during an acquisition period; spread the first sensed signals responsive to a first spreading code during a first acquisition cycle of the acquisition period; and spread the first sensed signals responsive to the first spreading code during a second acquisition cycle of the acquisition period.

Embodiment 7: the system according to any of the previous Embodiments, wherein the first spreading code comprises at least a first bit and a second bit, and the acquisition circuitry is configured to: convolve a first sensed signal of the first sensed signals with the first bit of the first spreading code; and convolve a second sensed signal of the first sensed signals with the second bit of the first spreading code.

Embodiment 8: the system according to any of the previous Embodiments, wherein the acquisition circuitry is configured to: convolve the first sensed signal of the first sensed signals with the first bit of the first spreading code during the first acquisition period; and convolve the second sensed signal of the first sensed signals with the second bit of the first spreading code during the second acquisition period.

Embodiment 9: the system according to any of the previous Embodiments, wherein the sense lines comprise a second sense line, and the acquisition circuitry is configured to: receive second sensed signals of the sensed signals at the first sense line during the acquisition period; spread the second sensed signals responsive to a second spreading code during the first acquisition cycle of the acquisition period;

and spread the second sensed signals responsive to the second spreading code during the second acquisition cycle of the acquisition period.

Embodiment 10: the system according to any of the previous Embodiments, wherein the second spreading code comprises at least a first bit and a second bit, and the acquisition circuitry is configured to: convolve a first sensed signal of the second sensed signals with the first bit of the second spreading code; and convolve a second sensed signal of the second sensed signals with the second bit of the second spreading code.

Embodiment 11: the system according to any of the previous Embodiments, wherein the second spreading code comprises at least a first bit and a second bit, the acquisition circuitry is configured to: convolve the first sensed signal of the second sensed signals with the first bit of the second spreading code during the first acquisition period; and convolve the second sensed signal of the second sensed signals with the second bit of the second spreading code during the second acquisition period.

Embodiment 12: the system according to any of the previous Embodiments, wherein the sense lines comprise a second sense line and a second sense line, and the acquisition circuitry is configured to: receive a first sensed signal at the first sense line and a second sensed signal at the second sense line; spread the first sensed signal responsive to a first spreading code of the one or more spreading codes; spread the second sensed signal responsive to a second spreading code of the one or more spreading codes; and accumulate the spread first sensed signal and the spread second sensed signal.

Embodiment 13: the system according to any of the previous Embodiments, wherein the digital controller is configured to differentiate the accumulated divided sensed signals responsive to the one or more spreading codes.

Embodiment 14: the system according to any of the previous Embodiments, wherein the digital controller is configured to determine touch information responsive to the channel capacitance measurement.

Embodiment 15: the system according to any of the previous Embodiments, wherein the digital controller is configured to provide the one or more spreading codes.

Embodiment 16: the system according to any of the previous Embodiments, wherein the one or more spreading codes comprise digital logic circuitry configured to receive sensed signals and acquisition cycle information and provide a spread sensed signal.

Embodiment 17: a method of acquiring sensed signals from a capacitive sensor, comprising: receiving one or more sensed signals at one or more sensor channels associated with a capacitive sensor; dividing the one or more sensed signals; and accumulating one or more divided sensed signals.

Embodiment 18: the method according to any of the previous Embodiments, wherein dividing the one or more sensed signals comprises spreading the sensed signals responsive to one or more spreading codes.

Embodiment 19: the method according to any of the previous Embodiments, wherein at least one spreading code of the one or more spreading codes is a binary code comprising two or more bits.

Embodiment 20: the method according to any of the previous Embodiments, further comprising receiving the sensed signals during an acquisition period, the acquisition period comprising two or more acquisition cycles.

Embodiment 21: the method according to any of the previous Embodiments, further comprising: receiving first sensed signals of the sensed signals at a first sense line of the sense lines during an acquisition period; spreading the first sensed signals responsive to a first spreading code during a first acquisition cycle of the acquisition period; and spreading the first sensed signals responsive to the first spreading code during a second acquisition cycle of the acquisition period.

Embodiment 22: the method according to any of the previous Embodiments, further comprising: convolve a first sensed signal of the first sensed signals with a first bit of the first spreading code; and convolve a second sensed signal of the first sensed signals with a second bit of the first spreading code.

Embodiment 23: the method according to any of the previous Embodiments, further comprising: receiving second sensed signals of the sensed signals at a second sense line of the sense lines during the acquisition period; spreading the second sensed signals responsive to a second spreading code during the first acquisition cycle of the acquisition period; and spreading the second sensed signals responsive to the second spreading code during the second acquisition cycle of the acquisition period.

Embodiment 24: the method according to any of the previous Embodiments, further comprising: convolve a first sensed signal of the second sensed signals with a first bit of the second spreading code; and convolve a second sensed signal of the second sensed signals with a second bit of the second spreading code.

Embodiment 25: the method according to any of the previous Embodiments, further comprising: receiving a first sensed signal at a first sense line of the sense lines and a second sensed signal at a second sense line of the sense lines; spreading the first sensed signal responsive to a first spreading code of the one or more spreading codes; spreading the second sensed signal responsive to a second spreading code of the one or more spreading codes; and accumulating the spread first sensed signal and the spread second sensed signal.

Embodiment 26: the method according to any of the previous Embodiments, further comprising differentiating the accumulated divided sensed signals responsive to the one or more spreading codes.

Embodiment 27: the method according to any of the previous Embodiments, further comprising determining at least one channel capacitance measurement responsive to the one or more divided sensed signals.

Embodiment 28: the method according to any of the previous Embodiments, further comprising determining touch information responsive to the at least one channel capacitance measurement.

Embodiment 29: the method according to any of the previous Embodiments, further comprising: differentiating the accumulated divided sensed signals responsive to the one or more spreading codes; integrating one or more individual divided sensed signals; and determining one or more capacitive channel measurements responsive to the integrated sensed signals.

Embodiment 30: the method any of the previous Embodiments, wherein each spreading code is associated with one of the one or more sensor lines.

Embodiment 31: a digital controller for capacitive sensing, the controller comprising: a decoder configured to: differentiate accumulated sensed signals responsive to one or more spreading codes; and integrate differentiated divided sensed signals, and a processor configured to determine one or more capacitive channel measurements responsive to the integrated sensed signals.

Embodiment 32: the digital controller according to any of the previous Embodiments, wherein the decoder is configured to: determine first differentiated divided sensed signals of the differentiated divided sensed signals responsive to a first spreading code of the one or more spreading code and the accumulated sensed signals.

Embodiment 33: the controller according to any of the previous Embodiments, wherein the first differentiated divided sensed signal comprises at least two intermediate values and the decoder is configured to integrate the first differentiated divided sensed signal by adding the at least two intermediate values.

Embodiment 34: the controller according to any of the previous Embodiments, wherein the decoder is configured to: determine second differentiated divided sensed signals of the differentiated divided sensed signals responsive to a second spreading code of the one or more spreading code and the accumulated sensed signals.

Embodiment 35: the controller according to any of the previous Embodiments, wherein the second differentiated divided sensed signal comprises at least two intermediate values and the decoder is configured to integrate the second differentiated divided sensed signal by adding the at least two intermediate values.

Embodiment 36: the controller according to any of the previous Embodiments, wherein the processor is configured to determine touch information responsive to the one or more capacitive channel measurements.

Embodiment 37: the controller according to any of the previous Embodiments, wherein the processor is configured to provide the one or more spreading codes to acquisition circuitry.

Embodiment 38: a method for controlling capacitive sensing, the controller comprising: differentiating accumulated sensed signals responsive to one or more spreading codes; integrating differentiated divided sensed signals, and determining one or more capacitive channel measurements responsive to the integrated sensed signals.

Embodiment 39: the method according to any of the previous Embodiments, further comprising determining first differentiated divided sensed signals of the differentiated divided sensed signals responsive to a first spreading code of the one or more spreading code and the accumulated sensed signals.

Embodiment 40: the method according to any of the previous Embodiments, wherein the first differentiated divided sensed signal comprises at least two intermediate values, and the method further comprises integrating the first differentiated divided sensed signal by adding the at least two intermediate values.

Embodiment 41: The method according to any of the previous Embodiments, further comprising determining second differentiated divided sensed signals of the differentiated divided sensed signals responsive to a second spreading code of the one or more spreading code and the accumulated sensed signals.

Embodiment 42: the method according to any of the previous Embodiments, wherein the second differentiated divided sensed signal comprises at least two intermediate values, and the method further comprises integrating the second differentiated divided sensed signal by adding the at least two intermediate values.

Embodiment 43: the method according to any of the previous Embodiments, further comprising determining touch information responsive to the one or more capacitive channel measurements.

Embodiment 44: the method according to any of the previous Embodiments, further comprising providing the one or more spreading codes.

Embodiment 45: a capacitive sensing system, comprising: a sensor circuitry comprising sense lines and drive lines; an encoder configured to provide encoded drive signals responsive to one or more spreading codes; a frequency spreader configured to provide modulated drive signals responsive to one or more transmit frequencies and one or more encoded drive signals; an acquisition circuitry configured to provide accumulated signals responsive to one or more sensed signals; a frequency de-spreader configured to provide demodulated signals responsive to one or more accumulated signals; a decoder configured to provide differentiated signals responsive to one or more demodulated signals; and digital logic configured to provide channel capacitance measurements responsive to one or more differentiated signals.

Embodiment 46: the system according to any of the previous Embodiments, wherein at least one spreading code of the one or more spreading codes is a binary code comprising two or more bits.

Embodiment 47: the system according to any of the previous Embodiments, wherein the encoder is configured to spread drive signals responsive to the one or more spreading codes.

Embodiment 48: the system according to any of the previous Embodiments, wherein the encoder is configured to spread drive signals responsive to a first spreading code, and to spread drive signals responsive to a second spreading code.

Embodiment 49: the system according to any of the previous Embodiments, wherein the frequency spreader is configured to modulate first encoded drive signals responsive to a first transmit frequency.

Embodiment 50: the system according to any of the previous Embodiments, wherein the frequency spreader is configured to modulate second encoded drive signals responsive to a second transmit frequency.

Embodiment 51: the system according to any of the previous Embodiments, wherein the encoder is configured to provide the encoded drive signals during an acquisition period, and the frequency spreader is configured to provide the modulated drive signals during the acquisition period, wherein the acquisition period comprises one or more acquisition cycles.

Embodiment 52: the system according to any of the previous Embodiments, wherein the encoder is configured to provide first encoded drive signals during a first acquisition cycle of the acquisition period, and the frequency spreader is configured to provide first modulated drive signals during the first acquisition cycle.

Embodiment 53: the system according to any of the previous Embodiments, wherein the encoder is configured to provide second encoded drive signals during a second acquisition cycle of the acquisition period, and the frequency spreader is configured to provide the second modulated drive signals during the second acquisition cycle, wherein the second acquisition cycle is subsequent to the first acquisition cycle.

Embodiment 54: the system according to any of the previous Embodiments, wherein the encoder is configured to provide first encoded drive signals of the encoded drive signals responsive to a first spreading code of the one or more spreading codes, and provide second encoded drive signals of the encoded drive signals responsive to a second spreading code of the one or more spreading codes.

Embodiment 55: the system according to any of the previous Embodiments, wherein the encoder is configured to provide the first encoded drive signals and the second encoded drive signals during the same acquisition period.

Embodiment 56: the system according to any of the previous Embodiments, wherein the frequency spreader is configured to provide first modulated drive signals of the modulated drive signals responsive to a first frequency transmit of the one or more frequency transmits, and provide second modulated drive signals of the modulated drive signals responsive to a second frequency transmit of the one or more frequency transmits.

Embodiment 57: the system according to any of the previous Embodiments, wherein the frequency spreader is configured to provide the first modulate drive signals and the second modulated drive signals during the same acquisition period.

Embodiment 58: the system according to any of the previous Embodiments, wherein the sensor circuitry is configured to receive the modulated drive signals at drive lines.

Embodiment 59: the system according to any of the previous Embodiments, wherein the sensor circuitry is configured to receive first modulated drive signals at a first drive line, and to receive second modulated drive signals at a second drive line, wherein the first modulated drive signals have a first frequency and the second modulated drive signals have exhibit a second frequency.

Embodiment 60: the system according to any of the previous Embodiments, wherein the sensor circuitry is configured to provide the sensed signals at one or more sense lines.

Embodiment 61: the system according to any of the previous Embodiments, wherein the sensed signals are indicative of one or more capacitances at the sensor circuitry.

Embodiment 62: the system according to any of the previous Embodiments, wherein acquisition circuitry is configured to accumulate the sensed signals, wherein the sensed signals are received at the sense lines.

Embodiment 63: the system according to any of the previous Embodiments, wherein the frequency de-spreader is configured to demodulate accumulated signals responsive to the one or more transmit frequencies.

Embodiment 64: the system according to any of the previous Embodiments, wherein the decoder is configured to differentiate the demodulated signals responsive to the one or more spreading codes.

Embodiment 65: the system according to any of the previous Embodiments, wherein a first differentiated signal of the one or more differentiated signals comprises at least two intermediate values and the digital logic is configured to integrate the first differentiated signal by summing the at least two differentiated values.

Embodiment 66: the system according to any of the previous Embodiments, wherein the digital logic is configured to determine touch information responsive to the channel capacitance measurements.

Embodiment 67: the system according to any of the previous Embodiments, wherein the digital logic is configured to provide the one or more spreading codes.

Embodiment 68: the system according to any of the previous Embodiments, wherein the one or more spreading codes comprise digital logic circuitry configured to receive drive signals and acquisition cycle information and provide encoded drive signals.

Embodiment 69: a method of sensing channel capacitance of sensor circuitry, the method comprising: encoding drive signals responsive to one or more spreading codes; modulating encoded drive signals responsive to one or more transmit frequencies and one or more encoded drive signals; providing modulated encoded drive signals at drive lines of the sensor circuitry; acquiring sensed signals at sense lines of the sensor circuitry; demodulating the sensed signals responsive to the one or more transmit frequencies; decoding demodulated sensed signals responsive to the one or more spreading codes; and measuring channel capacitance of the sensor circuitry responsive to one or more demodulated sensed signals.

Embodiment 70: the method according to any of the previous Embodiments, further comprising wherein at least one spreading code of the one or more spreading codes is a binary code comprising two or more bits.

Embodiment 71: the method according to any of the previous Embodiments, further comprising encoding drive signals responsive to a first spreading code, and encoding drive signals responsive to a second spreading code.

Embodiment 72: the method according to any of the previous Embodiments, further comprising modulating first encoded drive signals responsive to a first transmit frequency.

Embodiment 73: the method according to any of the previous Embodiments, further comprising modulating second encoded drive signals responsive to a second transmit frequency.

Embodiment 74: the method according to any of the previous Embodiments, further comprising providing the encoded drive signals during an acquisition period, and providing the modulated drive signals during the acquisition period, wherein the acquisition period comprises one or more acquisition cycles.

Embodiment 75: the method according to any of the previous Embodiments, further comprising providing first encoded drive signals during a first acquisition cycle of the acquisition period, and providing first modulated drive signals during the first acquisition cycle.

Embodiment 76: the method according to any of the previous Embodiments, further comprising providing second encoded drive signals during a second acquisition cycle of the acquisition period, and providing the second modulated drive signals during the second acquisition cycle, wherein the second acquisition cycle is subsequent to the first acquisition cycle.

Embodiment 77: the method according to any of the previous Embodiments, further comprising providing first encoded drive signals of the encoded drive signals responsive to a first spreading code of the one or more spreading codes, and providing second encoded drive signals of the encoded drive signals responsive to a second spreading code of the one or more spreading codes.

Embodiment 78: the method according to any of the previous Embodiments, further comprising providing the first encoded drive signals and the second encoded drive signals during the same acquisition period.

Embodiment 79: the method according to any of the previous Embodiments, further comprising providing first modulated drive signals of the modulated drive signals responsive to a first frequency transmit of the one or more frequency transmits, and providing second modulated drive signals of the modulated drive signals responsive to a second frequency transmit of the one or more frequency transmits.

Embodiment 80: the method according to any of the previous Embodiments, further comprising providing the first modulate drive signals and the second modulated drive signals during the same acquisition period.

Embodiment 81: the method according to any of the previous Embodiments, further comprising receiving the modulated drive signals at drive lines.

Embodiment 82: the method according to any of the previous Embodiments, further comprising receiving first modulated drive signals at a first drive line, and receiving second modulated drive signals at a second drive line, wherein the first modulated drive signals have a first frequency and the second modulated drive signals have exhibit a second frequency.

Embodiment 83: the method according to any of the previous Embodiments, further comprising providing the sensed signals at one or more sense lines.

Embodiment 84: the method according to any of the previous Embodiments, wherein the sensed signals are indicative of one or more capacitances at the sensor circuitry.

Embodiment 85: the method according to any of the previous Embodiments, further comprising accumulating the sensed signals, wherein the sensed signals are received at the sense lines.

Embodiment 86: the method according to any of the previous Embodiments, further comprising demodulating accumulated signals responsive to the one or more transmit frequencies.

Embodiment 87: the method according to any of the previous Embodiments, further comprising differentiating the demodulated signals responsive to the one or more spreading codes.

Embodiment 88: the method according to any of the previous Embodiments, wherein a first differentiated signal of the one or more differentiated signals comprises at least two intermediate values.

Embodiment 89: the method according to any of the previous Embodiments, further comprising summing the at least two differentiated values.

Embodiment 90: the method according to any of the previous Embodiments, further comprising determining touch information responsive to the channel capacitance measurements.

Embodiment 91: the method according to any of the previous Embodiments, further comprising providing the one or more spreading codes.

Embodiment 92: the method according to any of the previous Embodiments, wherein the one or more spreading codes comprise digital logic circuitry configured to receive drive signals and acquisition cycle information and provide encoded drive signals.

Embodiment 93: a digital controller for capacitive sensing, the controller comprising digital logic circuitry configured to provide channel capacitance measurements responsive to one or more differentiated signals.

Embodiment 94: the digital controller according to any of the previous Embodiments, further comprising an encoder configured to provide encoded drive signals responsive to one or more spreading codes.

Embodiment 95: the digital controller according to any of the previous Embodiments, further comprising a frequency spreader configured to provide modulated drive signals responsive to one or more transmit frequencies and one or more encoded drive signals.

Embodiment 96: the digital controller according to any of the previous Embodiments, further comprising a frequency de-spreader configured to provide demodulated signals responsive to one or more accumulated signals.

Embodiment 97: the digital controller according to any of the previous Embodiments, further comprising a decoder configured to provide differentiated signals responsive to one or more demodulated signals.

Embodiment 98: a control method any of the previous Embodiments, comprising providing channel capacitance measurements responsive to one or more differentiated signals.

Embodiment 99: a capacitive sensing method any of the previous Embodiments, comprising: receiving one or more encoded and frequency spread drive signals at one or more drives lines of a capacitive sensor; and providing one or more sensed signals responsive to the one or more encoded a frequency spread drive signals.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

I claim:

1. A system, comprising:
   a sensor circuitry comprising sense lines;
   an acquisition circuitry operatively coupled to the sense lines of the sensor circuitry to receive sensed signals generated responsive to non-spread encoded drive signals, wherein the acquisition circuitry is configured to:
      receive sensed signals indicative of one or more capacitances at the sensor circuitry;
      spread-encode, responsive to one or more spreading codes, channel capacitance values accumulated from the received sensed signals to obtain spread-encoded channel capacitance values;
      accumulate the spread-encoded channel capacitance values to obtain an accumulated spread-encoded channel capacitance value; and
      provide the accumulated spread-encoded channel capacitance value; and
   a digital controller in communication with the acquisition circuitry to receive the accumulated spread-encoded channel capacitance value provided by the acquisition circuitry, the digital controller is configured to:
      decode, responsive to the one or more spreading codes, the accumulated spread-encoded channel capacitance value to obtain spread-encoded intermediate values respectively indicative of the channel capacitance values;
      de-spread the spread-encoded intermediate values to obtain intermediate values respectively indicative of relative contribution to change in channel capacitance at the sensor circuitry, wherein the intermediate values are different than the channel capacitance values; and
      determine touch information responsive to the intermediate values.

2. The system of claim 1, wherein at least one spreading code of the one or more spreading codes is a binary code comprising two or more bits.

3. The system of claim 1, wherein the acquisition circuitry is configured to receive the sensed signals during an acquisition period, the acquisition period comprising two or more acquisition cycles.

4. The system of claim 3, wherein the sense lines comprise a first sense line, and the acquisition circuitry is configured to:
receive first sensed signals of the sensed signals at the first sense line during an acquisition period;
spread a first channel capacitance value accumulated from the first sensed signals responsive to a first spreading code during a first acquisition cycle of the acquisition period; and
spread the first channel capacitance value responsive to the first spreading code during a second acquisition cycle of the acquisition period.

5. The system of claim 4, wherein the first spreading code comprises at least a first bit and a second bit, and the acquisition circuitry is configured to:
convolve the first channel capacitance value accumulated from a first sensed signal of the first sensed signals with the first bit of the first spreading code; and
convolve the first channel capacitance value with the second bit of the first spreading code.

6. The system of claim 5, wherein the acquisition circuitry is configured to:
convolve the first channel capacitance value with the first bit of the first spreading code during a first acquisition period; and
convolve the first channel capacitance value with the second bit of the first spreading code during a second acquisition period.

7. The system of claim 4, wherein the sense lines comprise a second sense line, and the acquisition circuitry is configured to:
receive second sensed signals of the sensed signals at the first sense line during the acquisition period;
spread a second channel capacitance value accumulated from the second sensed signals responsive to a second spreading code during the first acquisition cycle of the acquisition period; and
spread the second channel capacitance value responsive to the second spreading code during the second acquisition cycle of the acquisition period.

8. The system of claim 7, wherein the second spreading code comprises at least a first bit and a second bit, and the acquisition circuitry is configured to:
convolve the first channel capacitance value with the first bit of the second spreading code; and
convolve the second channel capacitance value with the second bit of the second spreading code.

9. The system of claim 7, wherein the second spreading code comprises at least a first bit and a second bit, the acquisition circuitry is configured to:
convolve the first channel capacitance value with the first bit of the second spreading code during a first acquisition period; and
convolve the second channel capacitance value with the second bit of the second spreading code during a second acquisition period.

10. The system of claim 1, wherein the sense lines comprise a first sense line and a second sense line, and the acquisition circuitry is configured to:
receive a first sensed signal at the first sense line and a second sensed signal at the second sense line;
spread a first channel capacitance value accumulated from the first sensed signal responsive to a first spreading code of the one or more spreading codes;
spread a second channel capacitance value accumulated from the second sensed signal responsive to a second spreading code of the one or more spreading codes; and
accumulate the spread first channel capacitance value and the spread second channel capacitance value.

11. A method, comprising:
receiving one or more sensed signals at an acquisition circuitry operatively coupled to sense lines of a sensor circuitry, the sensed signals generated responsive to non-spread encoded drive signals;
spread-encoding, responsive to one or more spreading codes, channel capacitance values accumulated from the one or more sensed signals to obtain spread-encoded channel capacitance values;
accumulating the channel capacitance values to obtain an accumulated spread-encoded channel capacitance value;
transmitting the accumulated spread-encoded channel capacitance value to a digital controller;
decoding, responsive to the one or more spreading codes, the accumulated spread-encoded channel capacitance value to obtain spread-encoded intermediate values respectively indicative of the channel capacitance values;
de-spread the spread-encoded intermediate values to obtain intermediate values respectively indicative of relative contribution to change in channel capacitance at the sensor circuitry, wherein the intermediate values are different than the channel capacitance values; and
determine touch information responsive to the intermediate values.

12. The method of claim 11, wherein at least one spreading code of the one or more spreading codes is a binary code comprising two or more bits.

13. The method of claim 12, further comprising receiving the sensed signals during an acquisition period, the acquisition period comprising two or more acquisition cycles.

14. The method of claim 13, comprising:
receiving first sensed signals of the sensed signals at a first sense line of sensor channels during an acquisition period;
spreading a first channel capacitance value accumulated from the first sensed signals responsive to a first spreading code during a first acquisition cycle of the acquisition period; and
spreading the first channel capacitance value responsive to the first spreading code during a second acquisition cycle of the acquisition period.

15. The method of claim 14, comprising:
convolve the first channel capacitance value accumulated from the first sensed signals of the first sensed signals with a first bit of the first spreading code; and
convolve the first channel capacitance value with a second bit of the first spreading code.

16. The method of claim 14, comprising:
receiving second sensed signals of the sensed signals at a second sense line of the sense lines during the acquisition period;
spreading a second channel capacitance value accumulated from the second sensed signals responsive to a second spreading code during the first acquisition cycle of the acquisition period; and
spreading the second channel capacitance value responsive to the second spreading code during the second acquisition cycle of the acquisition period.

17. The method of claim 16, comprising:
convolve the second channel capacitance value with a first bit of the second spreading code; and
convolve the second channel capacitance value with a second bit of the second spreading code.

18. The method of claim 11, comprising:
- receiving a first sensed signal at a first sense line of sensor channels and a second sensed signal at a second sense line of the sensor channels;
- spreading a first channel capacitance value accumulated responsive to the first sensed signal responsive to a first spreading code of the one or more spreading codes;
- spreading a second channel capacitance value accumulated responsive to the second sensed signal responsive to a second spreading code of the one or more spreading codes; and
- accumulating the spread first channel capacitance value and the spread second channel capacitance value.

19. The system of claim 1, wherein the one or more spreading codes comprise:
- a first spreading code comprising a first group of bits; and
- a second spreading code comprising a second group of bits,
- wherein the second group of bits is orthogonal to the first group of bits.

20. The method of claim 11, wherein spreading the channel capacitance values accumulated from the sensed signals responsive to one or more spreading codes comprises:
- spreading the channel capacitance values responsive to a first spreading code comprising a first group of bits; and
- spreading the channel capacitance values responsive to a second spreading code comprising a second group of bits, wherein the second group of bits is orthogonal to the first group of bits.

* * * * *